United States Patent
Hirasaki et al.

(10) Patent No.: US 6,695,055 B2
(45) Date of Patent: Feb. 24, 2004

(54) SUBTERRANEAN FORMATION WATER PERMEABILITY REDUCING METHODS

(75) Inventors: George J. Hirasaki, Bellaire, TX (US); Clarence A. Miller, Houston, TX (US)

(73) Assignee: Wm. Marsh Rice University, Houston, TX (US)

( * ) Notice: Subject to any disclaimer, the term of this patent is extended or adjusted under 35 U.S.C. 154(b) by 201 days.

(21) Appl. No.: 09/999,292

(22) Filed: Nov. 15, 2001

(65) Prior Publication Data

US 2003/0092578 A1 May 15, 2003

(51) Int. Cl.[7] ................................. E21B 43/26
(52) U.S. Cl. ....................... 166/294; 166/281
(58) Field of Search ....................... 166/281, 292, 166/293, 294

(56) References Cited

U.S. PATENT DOCUMENTS

| | | | |
|---|---|---|---|
| 4,432,882 A | * | 2/1984 | Raynolds et al. ...... 252/8.55 R |
| 4,495,995 A | | 1/1985 | Chen et al. ................. 166/273 |
| 4,694,906 A | | 9/1987 | Hutchins et al. ............ 166/294 |
| 6,435,277 B1 | * | 8/2002 | Qu et al. ..................... 166/281 |

FOREIGN PATENT DOCUMENTS

| | | | | |
|---|---|---|---|---|
| RU | 1759848 A1 | 1/1989 | ............ | C09K/7/08 |
| RU | 1763637 A1 | 8/1990 | ......... | E21B/33/138 |

* cited by examiner

Primary Examiner—William Neuder
(74) Attorney, Agent, or Firm—Robert A. Kent; C. Clark Dougherty, Jr.

(57) ABSTRACT

Methods of reducing the water permeability of a water producing zone in a subterranean formation are provided. The methods basically comprise introducing a polymeric surfactant and an inert gas into the water producing zone to thereby form a water permeability reducing foam therein. The polymeric surfactant has the property of facilitating the formation of the foam and the additional property of stabilizing the foam in the presence of flowing formation water.

18 Claims, No Drawings

SUBTERRANEAN FORMATION WATER PERMEABILITY REDUCING METHODS

BACKGROUND OF THE INVENTION

1. Field of the Invention

The present invention relates to methods of reducing the water permeability of a water producing zone in a subterranean formation without substantially reducing the hydrocarbons permeability thereof.

2. Description of the Prior Art

The production of water with hydrocarbons, i.e., oil and/or gas, from wells constitutes a major problem and expense in the production of hydrocarbons. While hydrocarbon producing wells are usually completed in hydrocarbon producing formations, when the formations contain layers of water and oil or when there are water producing zones near the hydrocarbon producing formations, the higher mobility of the water often allows it to flow into the well bores which penetrate the hydrocarbon producing formations by way of natural fractures and/or high permeability streaks. In the production of such wells, the ratios of water to hydrocarbons recovered often become so high that the cost of producing the water, separating it from the hydrocarbons and disposing of it represents a significant economic loss.

In order to reduce the production of undesired water from hydrocarbon producing formations, aqueous polymer solutions containing cross-linking agents have been utilized heretofore. In the case of naturally fractured formations such aqueous polymer solutions have been pumped into the hydrocarbon producing formations so that they enter water zones within and adjacent to the formations and cross-link therein The cross-linking of the polymer solutions causes them to form stiff gels which aid in stopping or reducing the flow of the undesired water. While the use of aqueous polymer solutions for reducing the production of undesired water has achieved varying degrees of success, the full blocking gels produced are not suitable for producing formation treatments unless the polymer solution can be placed solely in the offending water producing zone or zones therein. If a polymer solution is allowed to gel within a hydrocarbon producing zone, the cross-linked polymer gel formed will reduce or stop the flow of hydrocarbons in addition to the flow of water. The selected placement of a polymer solution in a producing formation requires expensive, time-consuming zonal isolation placement technology. In addition, even when a polymer solution is properly placed in a water producing zone, the cross-linked gels formed often do not remain stable in the zone due to thermal degradation and/or differences in the adsorption characteristics of the polymer and associated cross-linker and the like.

More recently, chemicals referred to as relative permeability modifiers have been utilized to decrease the production of water with hydrocarbons. That is, water permeability modifying chemicals such as polyacrylamide have been introduced into hydrocarbon and water producing formations so that the chemicals attach to adsorption sites on surfaces within the porosity of the formations. The presence of the chemicals in the formations has the effect of reducing the flow of water through the formations while having a minimal affect on the flow of hydrocarbons therethrough. The use of water permeability modifying chemicals in hydrocarbon and water producing formations to decrease the production of water is considerably less expensive than other techniques such as blocking the flow of water with cross-linked polymers, and does not require expensive zonal isolation techniques. However, the use of permeability modifying chemicals has of ten resulted in only small reductions in water production and/or unacceptable levels of reduction in the production of hydrocarbons.

Thus, there are needs for improved methods of treating water and hydrocarbon producing subterranean formations utilizing water permeability modifying techniques and chemicals which are more effective in reducing water production with minimal or no reduction in hydrocarbon production.

SUMMARY OF THE INVENTION

The present invention provides methods of reducing the water permeability of a water producing zone in a subterranean formation penetrated by a well bore which have a minimal affect on the flow of hydrocarbons through the zone that meet the needs described above and overcome the deficiencies of the prior art. The methods basically comprise introducing a polymeric surfactant and an inert gas into the water producing zone by way of the well bore to thereby form a water permeability reducing foam therein. The polymeric surfactant utilized has the property of facilitating the formation of the foam and the additional property of stabilizing the foam in the presence of flowing formation water whereby the foam remains in the zone for a long period of time.

Examples of particularly suitable polymeric surfactants useful in accordance with the present invention include, but are not limited to, ethylene oxide-propylene oxide-ethylene oxide tri-block copolymers and ethylene oxide-butylene oxide-ethylene oxide tri-block copolymers. These and other polymeric surfactants which can be utilized preferably have a molecular weight in the range of from about 5,000 to about 15,000.

The polymeric surfactant can be introduced into the producing zone in an aqueous carrier liquid such as salt water or brine. The gas, which can be natural gas or nitrogen, is separately introduced into the producing zone in the presence of the polymeric surfactant and water therein to thereby form the water permeability reducing foam in the zone. When hydrocarbons produced in the zone contact the foam, the foam destabilizes thereby allowing the hydrocarbons to be produced, but the foam remains in the water producing portions of the zone whereby the production of water in the zone is reduced.

It is, therefore, a general object of the present invention to provide improved methods of reducing the water permeability of a water producing zone in a subterranean formation while having a minimal affect on the flow of hydrocarbons therethrough.

Other and further objects, features and advantages of the present invention will be readily apparent to those skilled in the art upon a reading of the description of preferred embodiments which follows.

DESCRIPTION OF PREFERRED EMBODIMENTS

The present invention provides methods of treating water and hydrocarbons producing zones in subterranean formations to reduce the water permeability of the zones without substantially reducing the hydrocarbons permeability thereof. The term "water" when used in reference to the water produced with hydrocarbons from subterranean formations includes fresh water, salt water and brines, preferably salt water or brines.

The methods of the present invention for reducing the water permeability of a water producing zone in a subterranean formation penetrated by a well bore comprises the step of introducing a polymeric surfactant and an inert gas into the water producing zone by way of the well bore to thereby form a water permeability reducing foam therein. The polymeric surfactant has the property of facilitating the formation of the foam and the additional property of stabilizing the foam in the presence of flowing formation water.

The methods of the present invention for reducing the water permeability of a water and hydrocarbons producing zone in a subterranean formation penetrated by a well bore are comprised of the steps of: (a) introducing a polymeric surfactant into the zone by way of the well bore, the surfactant having the properties of facilitating the formation of a foam, stabilizing the foam in the presence of flowing formation water and destabilizing the foam in the presence of hydrocarbons; and then (b) introducing a gas into the zone by way of the well bore in the presence of the polymeric surfactant and water therein to thereby form a water permeability reducing foam in water producing portions of the zone.

As indicated above, the polymeric surfactants useful in accordance with the present invention must have the property of facilitating the formation of a foam, stabilizing the foam in the presence of flowing formation water and destabilizing the foam in the presence of hydrocarbons. It has been found that high molecular weight block polymers can have the required properties. Examples of suitable such block polymers include, but are not limited to, ethylene oxide-propylene oxide-ethylene oxide tri-block copolymers having molecular weights in the range of from about 5,000 to about 15,000 and ethylene oxide-butylene oxide-ethylene oxide tri-block copolymers having molecular weights of about 5,000 to about 15,000. A particularly suitable and presently preferred polymeric surfactant is an ethylene oxide-propylene oxide-ethylene oxide tri-block polymer having a molecular weight of about 15,000.

In accordance with the methods of this invention, the polymeric surfactant utilized is introduced into the water producing zone to be treated by way of the well bore penetrating the zone. Preferably, the polymeric surfactant is dissolved or dispersed in an aqueous carrier fluid and the carrier fluid-surfactant solution is pumped into the zone. The aqueous carrier liquid can be fresh water, an aqueous salt solution, brine or seawater. The aqueous carrier liquid is preferably salt water or brine. When salt water is used it can contain a variety of salts such as potassium chloride, sodium chloride, ammonium chloride and calcium chloride. The polymeric surfactant utilized is generally dissolved or dispersed in the aqueous carrier liquid in an amount in the range of from about 0.1% to about 5% by weight of the aqueous carrier liquid.

After the polymeric surfactant has been placed in the water producing subterranean zone, a gas for foaming water in the zone is introduced into the zone. The gas utilized is preferably natural gas or nitrogen with nitrogen being the most preferred. The gas is pumped into the zone by way of the well bore in an amount sufficient to form a foam with the aqueous solution or dispersion of the polymeric surfactant previously placed in the zone. That is, in a volumetric ratio of the gas to the aqueous solution or dispersion of the polymeric surfactant in the zone in the range of from about 1:1 to about 10:1. When the gas contacts water containing the polymeric surfactant previously introduced into the zone, a foam is formed and stabilized in the porosity of the zone. The presence of the foam substantially reduces the water flow through the zone, and because the foaming and stabilizing surfactant utilized is a high molecular weight surfactant, it is not readily leached or otherwise removed from the foam by water contact and stabilizes the foam for a long period of time. When produced hydrocarbons come into contact with the foam, the foam is destabilized and removed by the hydrocarbon flow. Thus, hydrocarbons produced in the zone readily flow through the zone, but water produced in the zone by way of fractures, permeable streaks and the like are prevented from flowing through the zone by the presence of the foam.

A preferred method of the present invention for reducing the water permeability of a water producing zone in a subterranean formation penetrated by a well bore is carried out as follows. A polymeric surfactant and an inert gas are introduced into the water producing zone by way of the well bore to thereby form a water permeability reducing foam therein, the polymeric surfactant having the property of facilitating the formation of the foam and the additional property of stabilizing the foam in the presence of flowing formation water.

Another preferred method of this invention for reducing the water permeability of a water and hydrocarbons producing zone in a subterranean formation penetrated by a well bore is as follows. An aqueous solution or dispersion of a polymeric surfactant is introduced into the zone by way of the well bore, the surfactant having the properties of facilitating the formation of a foam, stabilizing the foam in the presence of flowing formation water and destabilizing the foam in the presence of hydrocarbons. Thereafter, a gas is introduced into the zone by way of the well bore in the presence of the aqueous solution of the polymeric surfactant to thereby form a water permeability reducing foam in water producing portions of the zone.

Yet another preferred method of this invention for reducing the water permeability of a water and hydrocarbons producing zone in a subterranean formation penetrated by a well bore is as follows. An aqueous solution or dispersion of an ethylene oxide-propylene oxide-ethylene oxide block copolymer surfactant having a molecular weight in the range of from about 5,000 to about 15,000 is pumped into the zone by way of the well bore to facilitate the formation of a foam, stabilize the foam in the presence of flowing formation water and destabilize the foam in the presence of hydrocarbons, and then nitrogen gas is introduced into the zone by way of the well bore in the presence of the surfactant and water therein to thereby form a water permeability reducing foam in water producing portions of the zone.

As indicated previously, the carrier liquid is preferably salt water or brine and the polymeric surfactant is preferably present in the salt water or brine in the range of from about 0.1% to about 5% by weight of the salt water or brine. The gas utilized is preferably nitrogen gas, and the gas is preferably pumped into the zone in a volumetric ratio of the gas to the aqueous solution or dispersion of the polymeric surfactant in the zone in the range of from about 1:1 to about 10:1.

In order to further illustrate the methods of this invention, the following examples are given.

EXAMPLE 1

Screening tests were conducted to determine the water washout times of various polymeric and other surfactants. The procedure utilized in the screening tests is as follows. Each surfactant tested was dissolved or dispersed in fresh water at a concentration of 2% surfactant by weight of water.

The resulting water-surfactant mixtures were then each placed in a 1 inch diameter by 1 foot tall glass tube. Foam was generated in the glass tube by flowing air upwardly at a flow rate of 10 milliliters per minute through the water-surfactant mixture. Fresh water was then added to the top of the foam column at a flow rate of 3 milliliters per minute. The time required for the surfactant to be desorbed from the foam and for most of the foam to be washed out was measured. The various surfactants tested and the times for their washout are set forth in Table I below.

TABLE I

Surfactant Washout Tests

| Test No. | Surfactant | Washout Time, min. |
|---|---|---|
| 1 | Mixture of sodium dihexylsulfosuccinate and isopropanol | 2 |
| 2 | Sodium dodecyl sulfate | 2 |
| 3 | Sodium laureth sulfate | 62 |
| 4 | Mixture of alkyl polyoxyethylene ether and isopropanol | 3 |
| 5 | Mixture of alpha olefin sulfonate and ethylene glycol monobutyl ether | 3 |
| 6 | Mixture of alkyl ether sulfate and ethylene glycol monobutyl ether | 2 |
| 7 | Mixture of alkyl amines | 20 |
| 8 | Ethylene oxide-propylene oxide-ethylene oxide tri-block copolymer ($EO_{132}$-$PO_{56}$-$EO_{132}$) having a molecular weight of 14,600 | 135 |
| 9 | Ethylene oxide-propylene oxide-ethylene oxide tri-block copolymer ($EO_{103}$-$PO_{39}$-$EO_{103}$) having a molecular weight of 11,400 | 21 |
| 10 | Ethylene oxide-propylene oxide-ethylene oxide tri-block copolymer ($EO_{76}$-$PO_{30}$-$EO_{76}$) having a molecular weight of 8,400 | 100 |
| 11 | Ethylene oxide-propylene oxide-ethylene oxide tri-block copolymer ($EO_{26}$-$PO_{39}$-$EO_{26}$) having a molecular weight of 4,600 | 18 |
| 12 | Ethylene oxide-butylene oxide-ethylene oxide tri-block copolymer ($EO_{45}$-$BO_{14}$-$EO_{45}$) having a molecular weight of 5,000 | 92 |
| 13 | Ethylene oxide-butylene oxide-ethylene oxide tri-block copolymer ($EO_{34}$-$BO_{11}$-$EO_{34}$) having a molecular weight of 3,800 | 57 |

From Table I, it can be seen that the surfactants tested in Test Nos. 4, and 9 through 14 generally functioned better than the other surfactants.

EXAMPLE 2

A number of the surfactants tested in Example 1 were tested in sand packs to determine their performance in reducing water permeability. The surfactants were dissolved or dispersed in fresh water at a concentration of 0.5% surfactant by weight of water. The resulting water-surfactant mixtures were then each used to generate a foam in a sand pack which was 1 inch in diameter by 2 feet long. That is, each water-surfactant mixture was used to form a foam in the sand pack by alternate injection of portions of the water-surfactant mixture and air. The pressure drop across the sand pack was then measured, and from the pressure drop a mobility reduction factor for liquid flow was calculated, i.e., the ratio of the pressure drop required to achieve a given volumetric flow rate with foam present to that when the sand pack was completely filled with water.

When foam with a mobility reduction factor near 100 was generated, surfactant-free 5% by weight brine was injected at a flow rate of 10 milliliters per minute and the pore volumes of water required to reduce the mobility reduction factor to a low value was measured. The various surfactants tested and the times for their washout are set forth in Table II below.

TABLE II

Sand Pack Washout Tests

| Test No. | Surfactant | Pore Volumes of Brine For Washout |
|---|---|---|
| 1 | Sodium laureth sulfate | 13.5 |
| 2 | Ethylene oxide-propylene oxide-ethylene oxide tri-block copolymer ($EO_{132}$-$PO_{56}$-$EO_{132}$) having a molecular weight of 14,600 | 27.5 |
| 3 | Ethylene oxide-propylene oxide-ethylene oxide tri-block copolymer ($EO_{103}$-$PO_{39}$-$EO_{103}$) having a molecular weight of 11,400 | 8.0 |
| 4 | Ethylene oxide-propylene oxide-ethylene oxide tri-block copolymer ($EO_{26}$-$PO_{39}$-$EO_{26}$) having a molecular weight of 4,600 | 5.0 |
| 5 | Ethylene oxide-butylene oxide-ethylene oxide tri-block copolymer ($EO_{45}$-$BO_{14}$-$EO_{45}$) having a molecular weight of 5,000 | 16.0 |

From Table II, it can be seen that the surfactants tested are effective in forming and stabilizing foams in the presence of flowing brine.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the water permeability of a water producing zone in a subterranean formation penetrated by a well bore comprising introducing a polymeric surfactant selected from the group consisting of ethylene oxide-propylene oxide-ethylene oxide tri-block copolymers and ethylene oxide-butylene oxide-ethylene oxide tri-block copolymers and an inert gas into said water producing zone by way of said well bore to thereby form a water permeability reducing foam therein, said polymeric surfactant having the property of facilitating the formation of said foam and the additional property of stabilizing said foam in the presence of flowing formation water.

2. The method of claim 1 wherein said polymeric surfactant is introduced into said zone as a solution or dispersion in an aqueous carrier liquid.

3. The method of claim 2 wherein said polymeric surfactant is present in said aqueous carrier liquid in an amount in the range of from about 0.1% to about 5% by weight of said carrier liquid.

4. The method of claim 2 wherein said aqueous carrier liquid is an aqueous salt solution or brine.

5. The method of claim 1 wherein said polymeric surfactant and said gas are separately introduced into said zone.

6. The method of claim 1 wherein said gas is selected from the group consisting of natural gas and nitrogen.

7. A method of reducing the water permeability of a water producing zone in a subterranean formation penetrated by a well bore comprising introducing a polymeric surfactant and an inert gas into said water producing zone by way of said well bore to thereby form a water permeability reducing foam therein, wherein said polymeric surfactant is an ethylene oxide-propylene oxide-ethylene oxide tri-block copolymer having a molecular weight in the range of from about 5,000 to about 15,000, said polymeric surfactant having the property of facilitating the formation of said foam and the additional property of stabilizing said foam in the presence of flowing formation water.

8. A method of reducing the water permeability of a water producing zone in a subterranean formation penetrated by a well bore comprising introducing a polymeric surfactant and an inert gas into said water producing zone by way of said well bore to thereby form a water permeability reducing foam therein, said polymeric surfactant having the property of facilitating the formation of said foam and the additional property of stabilizing said foam in the presence of flowing formation water, wherein said polymeric surfactant is introduced into said zone as a solution or dispersion in an aqueous carrier liquid, and wherein said gas is nitrogen and is introduced into said zone in a volumetric ratio of said gas to said aqueous solution or dispersion introduced therein in the range of from about 1:1 to about 10:1.

9. A method of reducing the water permeability of a water and hydrocarbons producing zone in a subterranean formation penetrated by a well bore comprising the steps of:
    (a) introducing a polymeric surfactant selected from the group consisting of ethylene oxide-propylene oxide-ethylene oxide tri-block copolymers and ethylene oxide-butylene oxide-ethylene oxide tri-block copolymers into said zone by way of said well bore, said surfactant having the properties of facilitating the formation of a foam, stabilizing said foam in the presence of flowing formation water and destabilizing said foam in the presence of hydrocarbons; and then
    (b) introducing a gas into said zone by way of said well bore in the presence of said polymeric surfactant and water therein to thereby form a water permeability reducing foam in water producing portions of said zone.

10. The method of claim 9 wherein said polymeric surfactant is introduced into said zone as a solution or dispersion in an aqueous carrier liquid.

11. The method of claim 10 wherein said polymeric surfactant is present in said aqueous carrier liquid in an amount in the range of from about 0.1% to about 5% by weight of said carrier liquid.

12. The method of claim 10 wherein said aqueous carrier liquid is an aqueous salt solution or brine.

13. The method of claim 9 wherein said gas is selected from the group consisting of natural gas and nitrogen.

14. The method of claim 9 wherein said gas is nitrogen and is introduced into said zone in a volumetric ratio of said gas to said aqueous solution or dispersion introduced therein in the range of from about 1:1 to about 10:1.

15. A method of reducing the water permeability of a water and hydrocarbons producing zone in a subterranean formation penetrated by a well bore comprising the steps of:
    (a) introducing a polymeric surfactant wherein said polymeric surfactant is an ethylene oxide-propylene oxide-ethylene oxide tri-block copolymer having a molecular weight in the range of from about 5,000 to about 15,000, into said zone by way of said well bore, said surfactant having the properties of facilitating the formation of a foam, stabilizing said foam in the presence of flowing formation water and destabilizing said foam in the presence of hydrocarbons; and then
    (b) introducing a gas into said zone by way of said well bore in the presence of said polymeric surfactant and water therein to thereby form a water permeability reducing foam in water producing portions of said zone.

16. A method of reducing the water permeability of a water and hydrocarbons producing zone in a subterranean formation penetrated by a well bore comprising the steps of:
    (a) pumping an ethylene oxide-propylene oxide-ethylene oxide tri-block copolymer surfactant into said zone in an aqueous carrier liquid by way of said well bore to facilitate the formation of a foam, stabilize said foam in the presence of flowing formation water and destabilize said foam in the presence of hydrocarbons; and then
    (b) introducing nitrogen gas into said zone by way of said well bore in the presence of said surfactant and water therein to thereby form a water permeability reducing foam in water producing portions of said zone.

17. The method of claim 16 wherein said surfactant is present in said aqueous carrier liquid in an amount in the range of from about 0.1% to about 5% by weight of said carrier liquid.

18. The method of claim 17 wherein said carrier liquid is salt water.

* * * * *